(12) United States Patent
Asai et al.

(10) Patent No.: US 6,638,047 B2
(45) Date of Patent: Oct. 28, 2003

(54) MOLDING MACHINE

(75) Inventors: Fumio Asai, Shizuoka-ken (JP); Norio Kawamura, Shizuoka-ken (JP); Yoshiyuki Akiyama, Shizuoka-ken (JP); Hiroshi Murashita, Shizuoka-ken (JP); Junichi Hamamoto, Shizuoka-ken (JP); Toshihiro Kitagawa, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 42 days.

(21) Appl. No.: 09/962,368

(22) Filed: Sep. 26, 2001

(65) Prior Publication Data
US 2002/0071886 A1 Jun. 13, 2002

(30) Foreign Application Priority Data
Sep. 27, 2000 (JP) ........................................ 2000-295136

(51) Int. Cl.$^7$ ............................................... B29C 45/16
(52) U.S. Cl. .................... 425/127; 425/129.1; 425/562; 425/572; 425/576
(58) Field of Search ................................ 425/112, 127, 425/129.1, 543, 562, 572, 576

(56) References Cited

U.S. PATENT DOCUMENTS 5,855,935 A * 1/1999 Brent et al. ................. 425/576

FOREIGN PATENT DOCUMENTS

JP 7-223235 8/1995

* cited by examiner

*Primary Examiner*—Tim Heitbrink
(74) *Attorney, Agent, or Firm*—Finnegan, Henderson, Farabow, Garrett & Dunner, L.L.P.

(57) ABSTRACT

A molding machine comprising an injection portion with an injection nozzle which injects a molding material, a turntable comprising a rotation driving apparatus, a plurality of molds placed along a peripheral edge of the turntable, an attaching and detaching station, an injection station and a plurality of curing stations. Each mold comprises a material receiving port communicating with the injection nozzle when the mold is positioned at the injection station. Each mold further comprises a mechanism which close the material receiving port so as to prevent the molding material from flowing backward when the mold is separated from the injection nozzle. The molds are transferred by rotation of the turntable to each station one by one. Primary formed products are attached to the molds at the attaching and detaching station, injected at the injection station, cured to be second formed products at the curing stations and finally took out at the attaching and detaching station.

7 Claims, 12 Drawing Sheets

MOLDING MACHINE

BACKGROUND OF THE INVENTION

1. Field of the Invention

The present invention relates to a forming machine executing an injection molding of a polymeric material such as a rubber, a resin and the like.

2. Description of the Related Art

As an injection molding machine of a rubber for injecting a rubber to a resin product after being molded so as to mold a packing, a rubber wire or the like which is integrally molded with the resin product, there has been conventionally known a structure which is provided with a rubber injecting apparatus, a turntable and a mold mounted on the turntable. In this injection molding machine, the structure is made such that the mold moves between a position below an injection nozzle of the injection apparatus and a position for attaching and detaching the resin product together with a rotation of the turntable. The mold is constituted by one upper portion executing a vertical motion at a position below the injection nozzle so as to clamp and open the mold, and two lower portions fixed to the turntable.

In order to molding by using the injection molding machine, the resin product is set to the lower dies at the attaching and detaching position, the upper die is clamped at the position below the injection nozzle by rotating the turntable, and thereafter the rubber is injected. At a time of injection, the rubber is vulcanized by pressing the injection nozzle of the injection apparatus to a nozzle touch portion in the upper portion, injecting the rubber within a cavity of the mold and further mainly overheating the lower dies.

As another injection molding machine, there is a structure disclosed in Japanese Patent Application Laid-Open No. 7-223235 in which more stations are provided than those in the injection molding machine mentioned above. In this molding machine, a thermosetting resin is injected, cured and taken out from the mold during a period that a mold apparatus moves among the respective stations by a rotary apparatus.

Further, there has been known a rotary injection molding machine in which a dwell pressure application apparatus is mounted to each of a plurality of molds arranged in the turntable. In this molding machine, the mold is opened and closed by an opening and closing hydraulic cylinder provided within a machine table at a mold detaching position, and the mold is clamped by a hydraulic cylinder provided within a machine table at an injecting position. A fluid flowing out to a circuit from the hydraulic cylinder for dwell pressure application in correspondence to the opening and closing operation of the mold is recovered by an accumulator so as to be reused.

SUMMARY OF THE INVENTION

In the rubber injection molding machine mentioned above, it is necessary to keep a state of pressing the injection nozzle to the nozzle touch portion in the upper portion until the rubber is completely vulcanized. Because the rubber within the cavity flows backward from the nozzle touch portion due to an internal pressure so as to be discharged out of the mold if the injection nozzle is detached away from the nozzle touch portion before the rubber is completely vulcanized. Accordingly, one cycle operation for molding the rubber is constituted by setting resin product to the lower portion, rotating the turntable, clamping the upper portion, injecting the rubber, vulcanizing, rotating the turntable and opening the mold which are executed sequentially, and accordingly, a long time is required. Therefore, in the conventional rubber injection molding machine, a rubber curing time gives an influence to a production efficiency.

In the molding machine disclosed in Japanese Patent Application Laid-Open No. 7-223235, it is unavoidable that the resin flows backward from the portion at which the resin material is injected to the mold apparatus from the injection nozzle so as to be discharged. Accordingly, there has been generated a problem that an accuracy of the molded product is reduced, and a burr is formed in the product. Further, it is necessary to reduce an amount of the resin injected to the mold apparatus in a side of the injection apparatus so as to supply, so that in the case of producing the products having different standard specifications by the same apparatus, a special control is required with respect to the injection apparatus. Accordingly, in this conventional apparatus, it is hard to mold plural kinds of products by one molding apparatus.

Further, in the rotary injection molding machine to which the dwell pressure application apparatus is mounted, there have been problems such that the load of the dwell pressure application apparatus is great with respect to the turntable, the apparatus for opening and closing or clamping the mold via the dwell pressure application apparatus is required, whereby the structure becomes complex and it is hard to make the structure compact and light, and the opening and closing speed is restricted in correspondence to the recovery and reuse of the fluid flowing out into the circuit.

An object of the present invention is to provide a molding machine which can significantly improve a production efficiency and can easily mold plural kinds of products. Further, another object of the present invention is to provide a molding machine which can individually and safely execute an opening and closing operation of a mold and a mold clamp in accordance with a simple structure by employing an air operation in place of a fluid pressure.

A first aspect of the present invention provides a molding machine comprising: a turntable having a driving gear; a plurality of molds placed along a peripheral edge of the turntable; an injection portion for injecting a molding material; the mold being sequentially moved to a position at which the injection portion is arranged, by driving the turntable; and an injection nozzle of the injection portion being communicated with a material receiving port of the mold so as to inject the molding material within the mold, wherein the molding machine comprises: a setting and detaching station setting a primary formed product previously molded in the mold and detaching a secondary formed product secondarily molded from the mold; an injection station applying a secondary mold to the primary formed product set to the mold in the set and detaching station; and a curing station arranged between the injection station and sat and detaching station and curing the molded material secondarily molded, and wherein the mold is provided with a back-flow preventing mechanism for closing the material receiving port.

In the structure mentioned above, since there is provided the back-flow preventing mechanism for closing the material receiving port in the mold, the back-flow preventing mechanism closes the material receiving port even when the injection nozzle is moved away from the material receiving port after the molding material is injected within the material receiving port from the injection nozzle in the injection portion, so that the molding material does not flow backward from the mold and it is possible to reduce a time for an injecting step. Since it is possible to individually execute the injecting step in the injection station, a curing step in the curing station and a setting and detaching step in the set and detaching station in each of the stations in the manner mentioned above, it is possible to independently arranged the respective steps in view of a position without being affected by a state of the molding material in the material receiving port, and it is possible to execute an injection process in a fast manner.

Accordingly, it is possible to improve a production efficiency of the molded product. Further, due to the back-flow preventing mechanism, it is possible to mold at a high accuracy without reducing a pressure of the molding material within the mold.

Further, a second aspect of the present invention provides a molding machine according to the structure mentioned above, wherein the mold is constructed by a combination of an upper portion and a lower portion, a material flow channel communicating with the material receiving port is formed in the upper portion along a vertical direction, and a back-flow preventing rod is fitted within the material flow channel so as to freely move in a vertical direction. The back-flow preventing rod is always urged upward, and closes the material receiving port in a state that an upper end protrudes out from the material receiving port, and when the injection nozzle moves downward so as to press down the upper end of the back-flow preventing rod, the molding material can be injected within the material flow channel. It is possible to prevent the molding material from backward flowing from the mold with requiring no complex mechanism.

Further, a third aspect of the present invention provides a molding machine according to the structure mentioned above, wherein a molding cavity is formed in a portion in which the upper portion and the lower portion are bonded. A primary formed product which has been already molded is arranged within the molding cavity, and a secondary forming is applied to the primary formed product by adding the molding material. In accordance with the structure mentioned above, in addition to the operation in the structure mentioned above, it is possible to easily and effectively execute an insert molding be previously arranging the primary formed product within the molding cavity.

A fourth aspect of the present invention provides a molding machine according to the structure mentioned above, wherein a material intake channel communicating with the material flow channel is formed in the upper portion, and a piston mechanism opening and closing the material pouring port through which the molding material is pouring into the mold is provided in the upper portion. In accordance with the piston mechanism, it is possible to open and close the material pouring.

A fifth aspect of the present invention provides a molding machine according to the structure mentioned above, wherein the molding material is a thermosetting resin, and a curing process of the molding material is performed by a heating apparatus. It is possible to effectively perform an injection molding with the thermosetting resin such as a rubber or the like, and it is possible to securely control a curing step.

A sixth aspect of the present invention provides a molding machine according to the structure mentioned above, wherein the injection portion is operated due to a hydraulic pressure, a mold clamping apparatus driven by pneumatic circuit is placed on the turntable together with the mold, and the mold clamping apparatus clamps the upper portion and the lower portion. Since the mold is opened and closed or clamped due to an air operation, it is possible to securely execute the mold clamping and the dwell pressure application by a simple structure.

A seventh aspect of the present invention provides a molding machine according to the structure mentioned above, wherein the mold is constructed by a combination of an upper portion and a lower portion, a material flow channel communicating with the material receiving port is formed in the upper portion along a vertical direction, a heating apparatus for heating the material flow channel is provided, a thermosetting molding material applies a secondary forming to a primary formed product from the material receiving port, and the heating apparatus cures the molding material within the material flow channel so as to close the material receiving port.

The molding material is injected from the injection nozzle of the injection portion to the material receiving port so as to apply the secondary forming to the primary formed product within the mold, and the molding material is cured within the material flow channel heated by the heating apparatus. Accordingly, it is possible to close the material receiving port by the molding material curing within the material flow channel so as to prevent the molding material from backward flowing from the mold.

DETAILED DESCRIPTION OF THE PREFERRED EMBODIMENT

A description will be given of a first embodiment by exemplifying a case of integrally molding a thermosetting material such as a rubber or the like with a connector housing corresponding to a primary formed product molded by a resin or the like so as to produce a secondary formed product.

Figure 1:
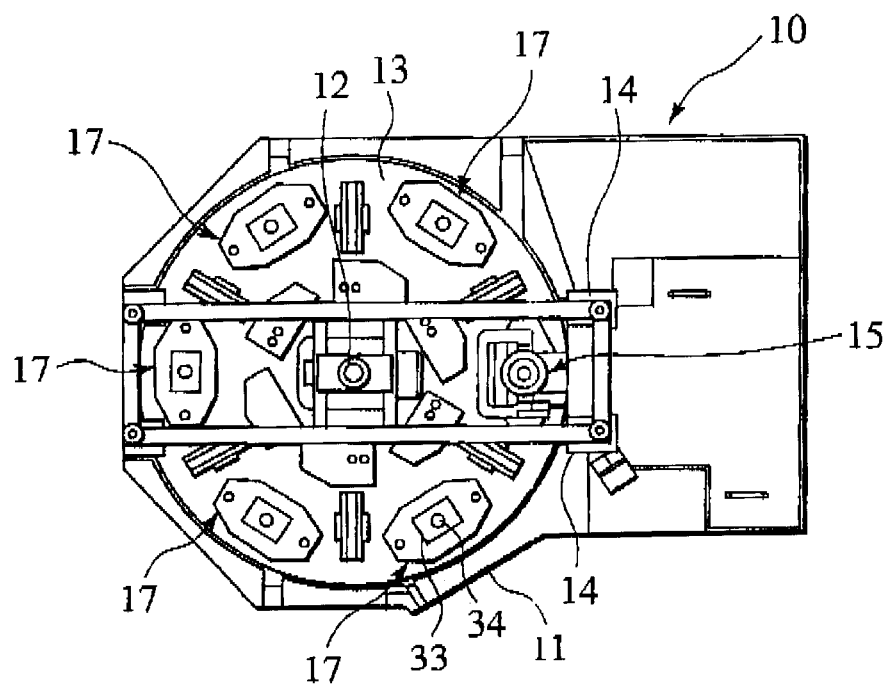
FIG. 1 is a plan view of a molding machine in accordance with a first embodiment of the present invention.
Figure 2:
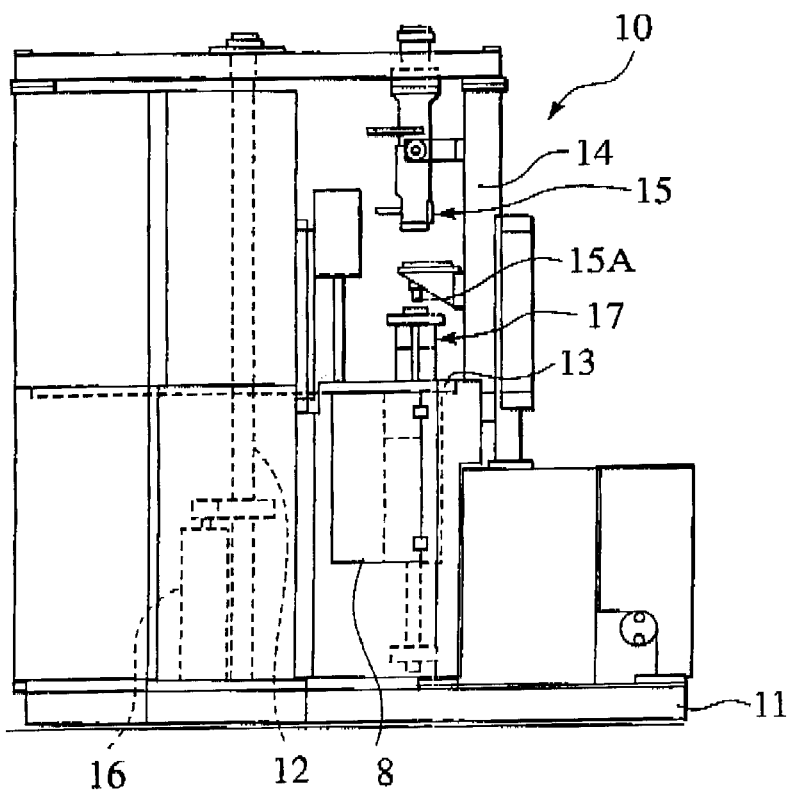
FIG. 2 is a side elevational view of the molding machine in accordance with the first embodiment of the present invention.

A molding machine 10 in accordance with the present embodiment is provided with a machine table 11, a turntable 13 disposed horizontally above the machine table 11 and capable of freely rotating, support columns 14 stand around the turntable 13 and an injection portion 15 provided in the support columns 14 so as to freely move in a vertical directions, as shown in FIGS. 1 and 2.

The machine table 11 is provided with a rotation driving portion 16, and the structure is made such that the rotary driving portion 16 rotates a rotary shaft 12 via a rotation transmitting means, for example, a gear or the like.

Molds 17 are placed at every angle of rotation of 60 degrees along a circumferential direction in a peripheral edge portion of the turntable 13. Further, the rotation driving portion 16 is driven and controlled so as to sequentially rotate and move the molds 17 arranged in the turntable 13 to a plurality of stations set at every angle of rotation of 60 degrees.

The injection portion 15 is provided with an injection nozzle 15A at a front end of a lower portion thereof, and is vertically driven so as to inject a molding material, for example, a rubber or the like to the molds 17.

Figure 3:
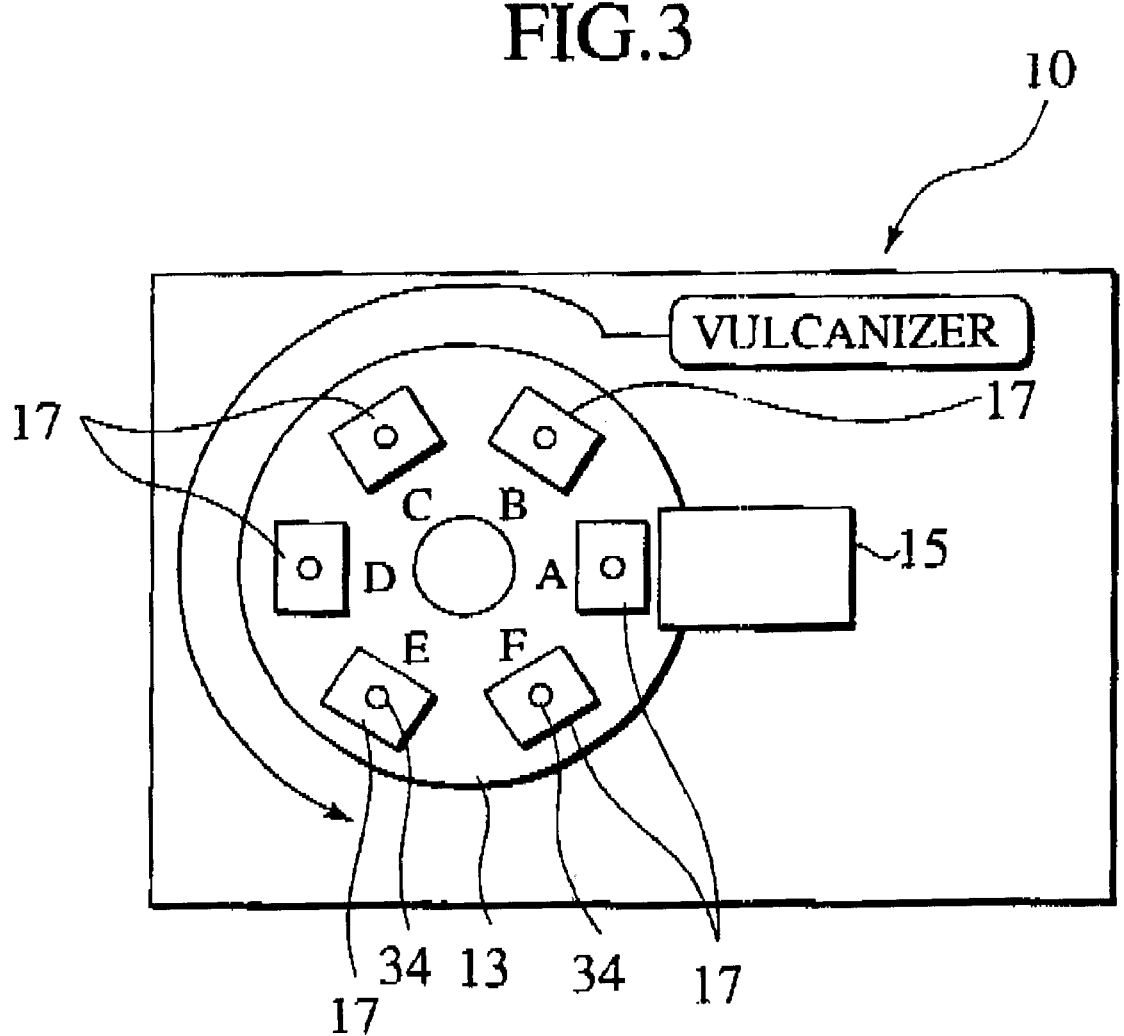
FIG. 3 is a plan view showing an arrangement of each of stations in the molding machine in accordance with the first embodiment of the present invention.

Six stations A to F are provided on the turntable, as shown in FIG. 3. Reference symbol A denotes an injection station in which the molds 17 are at a position of the injection portion 15, and reference symbol F denotes an attaching and detaching station being at a position of taking out a secondary formed product in which a molding and vulcanization is finished and setting a primary formed product. Reference symbols B, C, D and E through which the molds 17 pass until moving from the station A to the station F denote curing stations for vulcanizing and curing the rubber.

Figure 4:
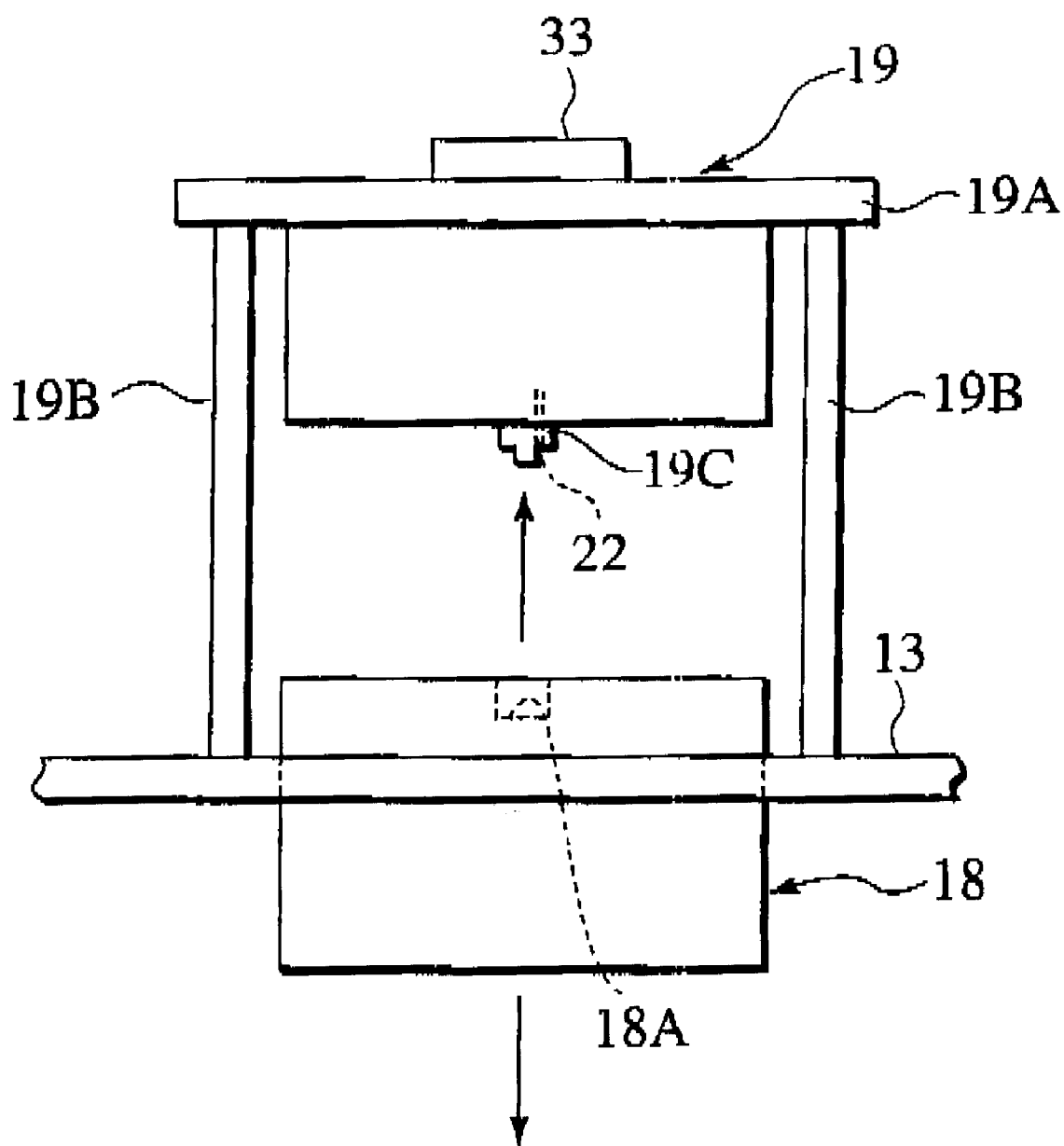
FIG. 4 is a side elevational view showing a motion of a mold in the molding machine in accordance with the first embodiment of the present invention.

The mold 17 is constituted of a lower portion 18 and an upper portion 19 as shown in FIG. 4. The lower portion 18 is structured such as to freely move in a vertical direction by a lower portion vertically moving apparatus 8 provided below the turntable 13, as shown in FIG. 2. Further, a molding concave portion 18A for receiving and arranging the primary formed product is formed on an upper surface of the lower portion 18. The upper portion 19 has a flange 19A formed in an upper portion thereof. The flange 19A is fixed to support columns 19B stood from the turntable 13, whereby the upper portion 19 is fixed so as to be positioned above the turntable 13.

A nozzle contact portion 33 mentioned below is provided on an upper surface of the upper portion 19, and a molding convex portion 19C for forming a cavity between a lower surface of the upper portion 10 and the primary formed product received in the molding concave portion 18A of the below 18 is protruded on the lower surface of the upper portion 19. A material pouring port 22 is formed in the molding convex portion 19C. Further, a lower end of a material intake channel 23 formed along a vertical direction is formed in the material pouring port 22 in the lower position 18 so as to communicate therewith. A material flow channel 25 formed along a vertical direction via a connection flow channel 24 is communicated with a middle portion of the material intake channel 23.

Figure 8:
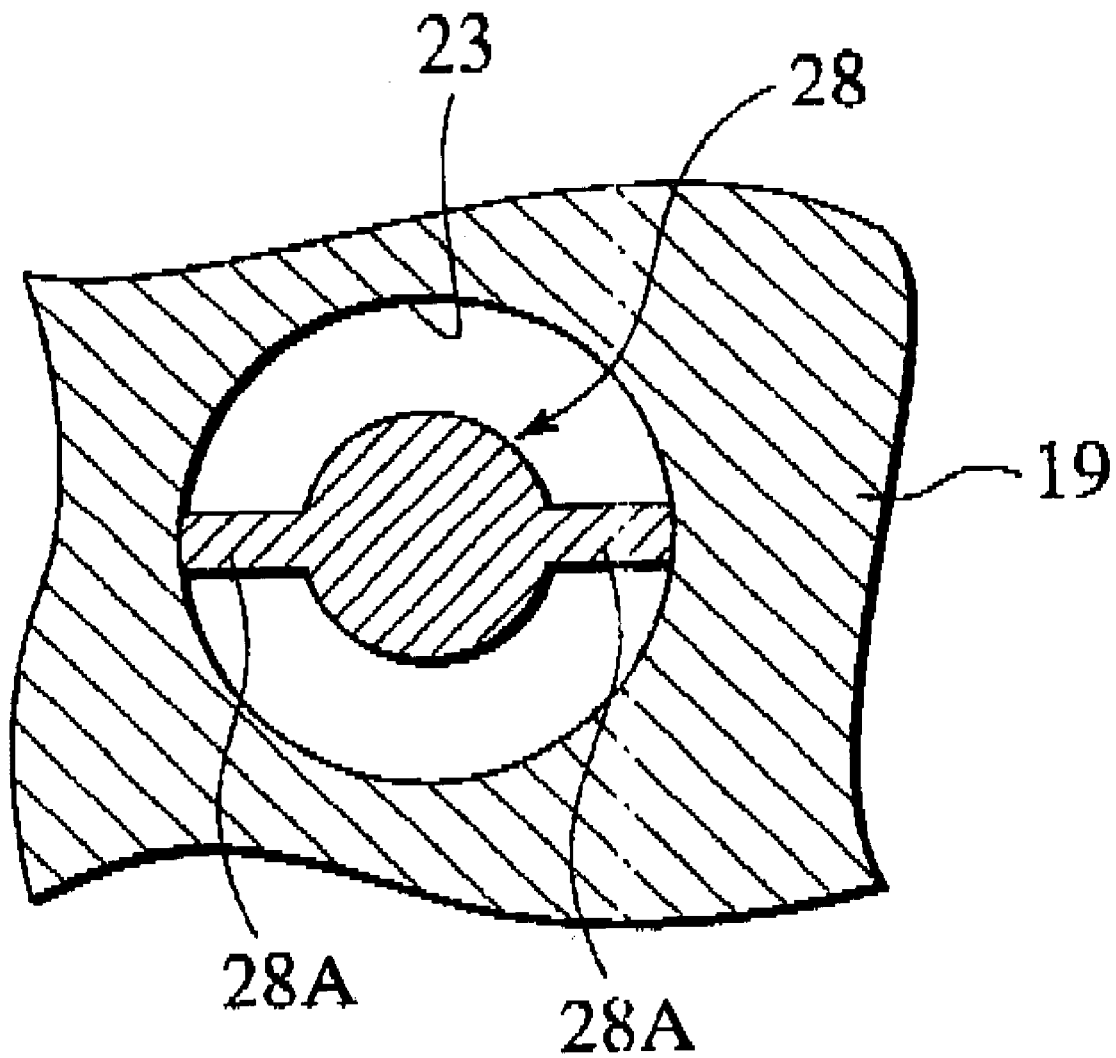
FIG. 8 is a cross sectional view of a main portion of a vertically moving rod of the mold and an upper portion in accordance with the first embodiment of the present invention.

A cylinder 26 having a center axis in a vertical direction is formed in an upper portion of the material intake channel 23. A piston 27 sliding in a vertical direction is closely fitted within the cylinder 26. A vertically moving rod 28 fitted within the material intake channel 23 is integrally provided in a lower end of the piston 27. The piston 27 is driven, whereby the vertically moving rod 28 vertically moves, so that a tip end 28B at a lower end opens and closes a narrow diameter 23A close to a pouring port 22 in the material intake channel 23. In this case, a transverse section between the lower portion of the vertically moving rod 28 and the material intake channel 23 is formed as shown in FIG. 8, and fins 28A for preventing a bumpy motion and securing a flow of the molding material are formed at both ends of the vertically moving rod 28.

Further, a dividing flange 29 fitted to an upper portion of the material intake channel 23 so as to be in a slidably close contact manner is integrally formed with an upper portion of the vertically moving rod 28. Further, a sliding guide 30 slidably in contact with an inner wall in the upper portion of the material intake channel 23 so as to stabilize the vertically moving motion of the vertically moving rod 28 is formed above the dividing flange 29 in the vertically moving rod 28.

Pressure medium flow channels 31 and 32 communicating with the cylinder 26 are formed in an upper side and a lower side of a movable area of the piston 27 in the cylinder 26 mentioned above. The structure is made such that an air corresponding to the pressure medium is fed to the pressure medium flow channels 31 and 32 by an air pump (not shown) so as to control pressure, so that the vertical motion of the piston 27 is controlled.

The material flow channel 25 is formed so as to communicate with a material receiving port 34 open to an upper surface of the nozzle contact portion 33 provided in the upper portion of the above side 19. A diameter of the material receiving port 34 is set to be smaller than a diameter of the material flow channel 25, and the diameter is made gradually smaller toward the upper material receiving port 34 in the material flow channel 25. A back-flow preventing rod 35 is fitted within the material flow channel 25 having the structure mentioned above so as to freely move in a vertical direction.

An upper end of the back-flow preventing rod 35 has a diameter smaller than that of the material receiving port 34, and a portion downward the same has a diameter larger than that of the material receiving port 34 and smaller than the material flow channel 25, thereby being prevented from taking out from the material receiving port 34. Further, an urging flange 37 closely fitted to a cylindrical spring receiving gap 36 formed in the upper portion 19 is integrally provided in a lower end of the back-flow preventing rod 35. A back-flow preventing spring 38 is received in the spring receiving gap 36, whereby the back-flow preventing rod 35 is always urged upward so as to close the material receiving port 34. Accordingly, the structure is made such that it is possible to prevent the molding material received within the material flow channel 25, the connecting flow channel 24 and the material intake channel 23 from flowing out from the material receiving port 34 to an outer side.

Next, a description will be given of a motion and an operation of the molding machine 10.

The secondary formed product in which the injection molding has been already finished is taken out, and the primary formed product 21 is set within the mold 17 on the turntable 13 positioned at the station F. A setting procedure is constituted by moving downward the lower portion 18 by the lower vertically moving apparatus 8, arranging the primary formed product 21 within the molding concave portion 18A and driving the lower portion 18 upward so as to combine the upper surface of the lower portion 18 and the lower surface of the upper portion 19. In this state, the pressure of the pressure medium within the pressure medium flow channels 31 and 32 is suitably set so that the piston 27 within the cylinder 26 of the upper portion 19 is positioned at a lowermost position within the movable area.

Figure 5:
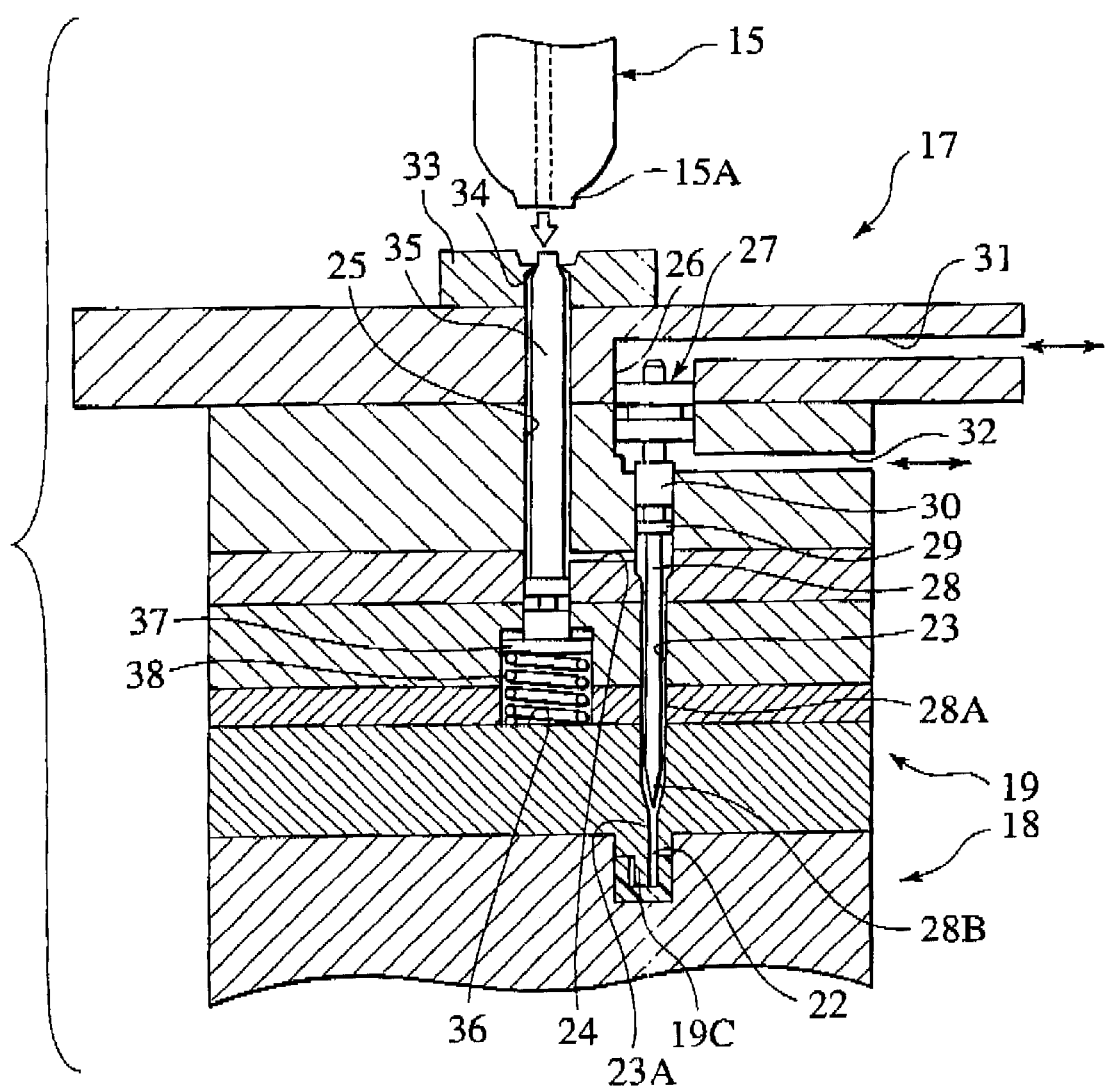
FIG. 5 is a cross sectional view showing a motion of the molding machine and the mold in accordance with the first embodiment of the present invention.

The mold 17 in which the primary formed product 21 is set moves to the station A below the injection nozzle 15A of the injection portion 15 due to the rotation of the turntable 13 executed by the rotation driving portion 16. That is, the turntable 13 rotates and moves at 60 degrees in a counter-clockwise direction in FIG. 3, and the nozzle contact portion 33 of the upper portion 19 is arranged so as to be positioned below the injection nozzle 15A. FIG. 5 is a cross sectional view of a state in which the mold 17 is in the station A.

Figure 6:
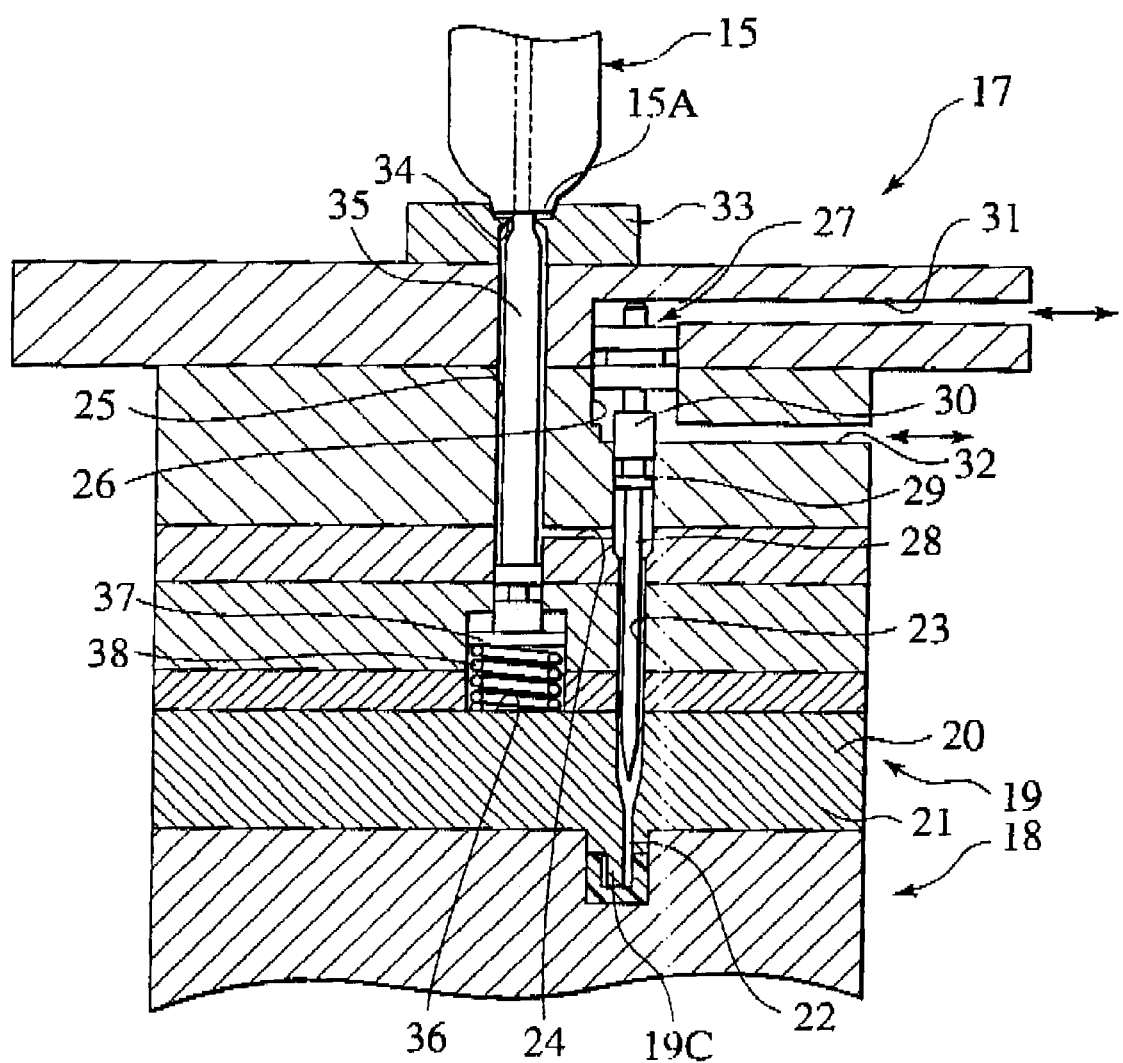
FIG. 6 is a cross sectional view showing a motion of the molding machine and the mold in accordance with the first embodiment of the present invention.

After the mold 17 moves to and stops at the station A, the injection portion 15 moves downward and the injection nozzle 15A is brought into contact with the front end of the back-flow preventing rod 35 as shown in FIG. 6, so as to press down the back-flow preventing rod 35 downward. Further, it is possible to inject the molding material within the material flow channel 25 by injecting the liquid-phase molding material from the injection nozzle 15A so as to further press down the back-flow preventing rod 35.

At the same time, the molding material taken within the material flow channel 25 is taken in the material intake channel 23 through the connecting flow channel 24 by suitably controlling the pressure of the medium within the pressure medium flow channels 31 and 32 so as to press down the piston 27. An amount thereof is controlled by a moving amount of the dividing flange 29. In correspondence to an amount of the molding material to be injected to the molding cavity, a vertically moving distance, a diameter and the like of the dividing flange 29 are previously determined.

Figure 7:
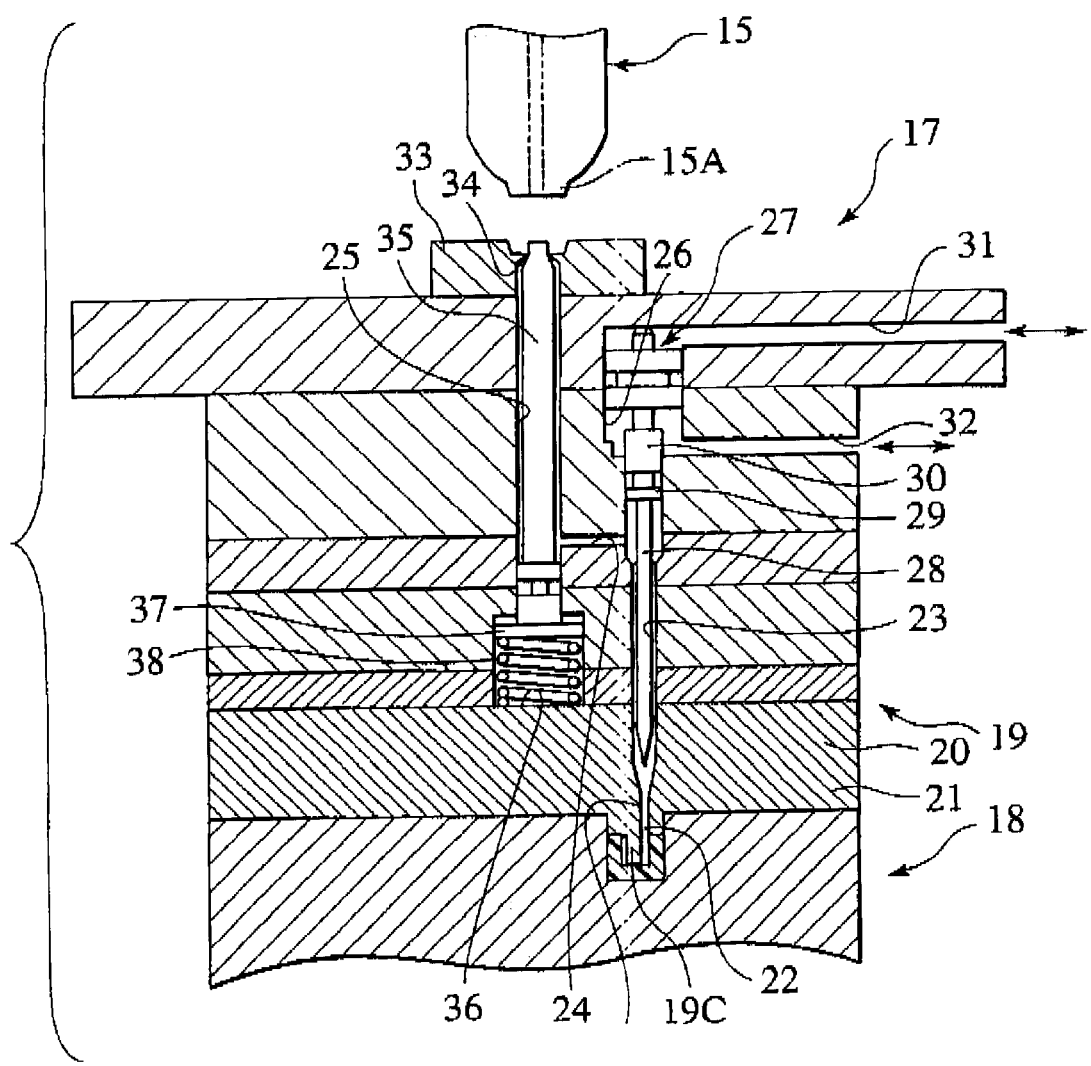
FIG. 7 is a cross sectional view showing a motion of the molding machine and the mold in accordance with the first embodiment of the present invention.

Next, as shown in FIG. 7, the injection portion 15 is moved upward. Then, the back-flow preventing rod 35 moves upward in a moment due to the urging force of the back-flow preventing spring 38 so as to close the material receiving port 34, thereby preventing the molding material from backward flowing. Next, although an illustration is omitted, the molding material taken in the material intake channel 23 is introduced within the cavity through the material pouring port 22 by controlling the pressure of the medium in the pressure medium flow channels 31 and 32 so as to move downward the piston 27.

At this time, the tip end 28B of the vertically moving rod 28 closes the material intake channel 23 near the material pouring port 22. When the piston 27 moves downward, the material receiving port 34 is closed by the back-flow preventing rod 35 and the molding material is charged within the material flow channel 25, so that the molding material within the material intake channel 23 is securely introduced to the cavity side without backward flowing.

Next, the mold 17 in which the injection is executed in the station A is moved to the vulcanizing position B shown in FIG. 3 on the basis of the rotation of the turntable 13. Prior to this operation, in the station F corresponding to the position of taking out and setting, the secondary formed product in which the vulcanization is completed is taken out, and the primary formed product is newly set. In the station A, since it is not necessary to hold the contact state between the injection nozzle 15A and the nozzle contact portion 33 after injecting the molding material to the upper portion 19, it is possible to move the mold 17 immediately after injecting the molding material.

In this case, the mold 17 in which the injection is finished is sequentially moved from the station B corresponding to the vulcanizing position to the station E, as shown in FIG. 3. During the movement, the mold 17 is heated from the lower portion, and the molding material injected within the cavity is vulcanized and cured.

In accordance with the present embodiment, as mentioned above, a time for which the mold 17 stays in the station A only requires a time necessary for the injection operation without relation to a time for which the molding material is cured. Accordingly, it is possible to execute the process step by step and a high productivity can be realized. Since it is possible to control an injecting amount of the molding material by controlling the motion of the piston, it is possible to produce the products of the different kinds by the same apparatus, and a large item small-scale production can be executed. Since it is possible to suitably keep the pressure within the molding cavity, it is possible to produce the molded product having a small allowable size error.

The embodiment mentioned above can be suitably modified. For example, in the embodiment mentioned above, the material receiving port 34 is opened and closed by the vertical movement of the back-flow preventing rod 35, however, the structure may be made such that a valve is provided in the material receiving port 34 in place of this. Further, in the embodiment mentioned above, the thermosetting rubber is exemplified, however, it is possible to use for molding a thermoplastic resin.

Next, a description will be given of a second embodiment in accordance with the present invention with reference to FIGS. 9 to 11. In the drawings, reference numeral 41 denotes an annular turntable horizontally arranged within an upper surface of a machine table 42. The turntable 41 is constituted by a circular plate rotatably supported to a top portion of a tower-like pedestal 43 stood in an inner portion of the machine table 42.

The turntable 41 is supported by rotatably fitting an annular gear 45 provided in a back side peripheral edge of a hole portion 44 in a table center portion to an annular receiving member 46 provided in the top portion of the pedestal 43 via a bearing, and a drive gear 47 is engaged with the annular gear 45.

The drive gear 47 is provided in a drive shaft of a driving apparatus 48 constituted by an electric servo motor and a speed reduction gear and upward mounted to a side portion of the pedestal 43, and the turntable 41 is structured such as to intermittently rotate at every 60 degrees by the driving apparatus 48.

Further, six mold clamping apparatuses 49 opening and closing in a vertical direction are arranged on the turntable 41. The mold clamping apparatus 49 is constituted by a pair of mold clamping rods 50 extending through the turntable 41 and freely moving in a vertical direction, an upper movable plate 51 and a lower movable plate 52 mounted to upper and lower ends of the mold clamping rod 50, and a mold clamping cylinder 53 downward mounted between the mold clamping rods on the back surface of the turntable 41 and connecting a piston rod 53a to the lower movable plate 52.

The mold clamping cylinder 53 and an ejector cylinder 54 are both constituted by an air cylinder, and are structured such as to open and close the mold 55 and clamp the mold by vertically moving the mold clamping rod 50 due to an expansion and contraction of the piston rod. An ejector provided in the lower portion 55 so as to extend through the turntable 41 is connected to a piston rod of the ejector cylinder 54.

In the drawing, reference numeral 57 denotes an electric relay apparatus arranged in a center portion of the turntable 41. The electric relay apparatus 57 is constituted by a rotary cylinder 60, a supporting column 62 fixed to a circular column core 58, a fixed terminal mounted to a periphery of the supporting column 62 in a multi-layered manner, and a movable terminal placed in an upper portion of the rotary cylinder 60 in such a manner as to be always in contact with the fixed terminal 63. The circular column core 58 is stood from a center of the top surface of the pedestal 43, and the rotary cylinder 60 is fitted to the circular column core 58 so as to be capable of rotating. A lower end of the rotary cylinder 60 is fitted to a hole portion lid plate 59 of the turntable 41.

Both of a signal terminal and a heater terminal 65a for heating the mold are provided in the movable terminal 65. These and an electric cord introduced out on the movable plate 51 are connected through a bellows-like guide, thereby giving no trouble for opening and closing the mold. Further, they are connected to an electric cord introduced out on the turntable 41.

Figure 9:
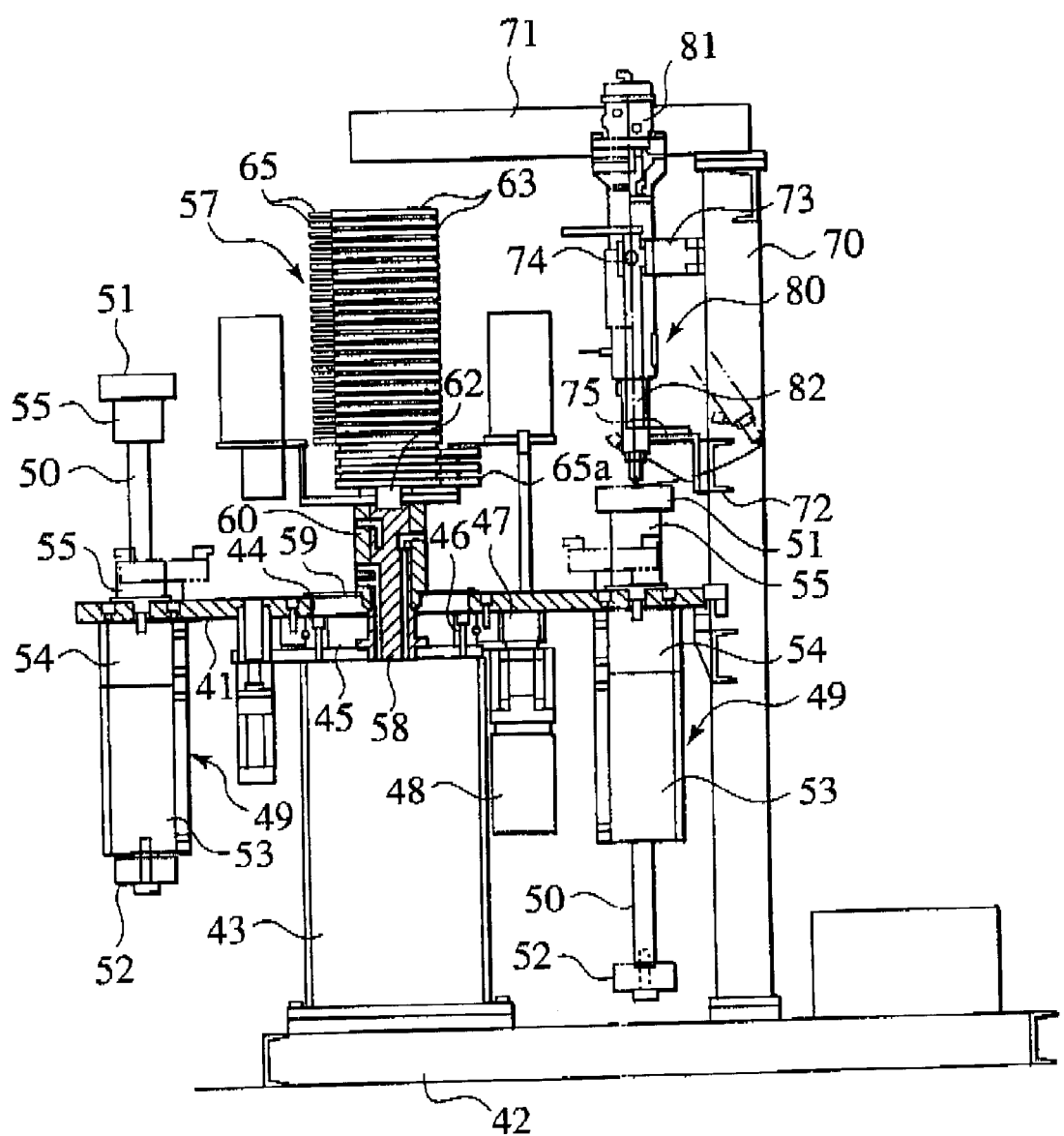
FIG. 9 is a vertical cross sectional view of a molding machine in accordance with a second embodiment of the present invention.
Figure 10:
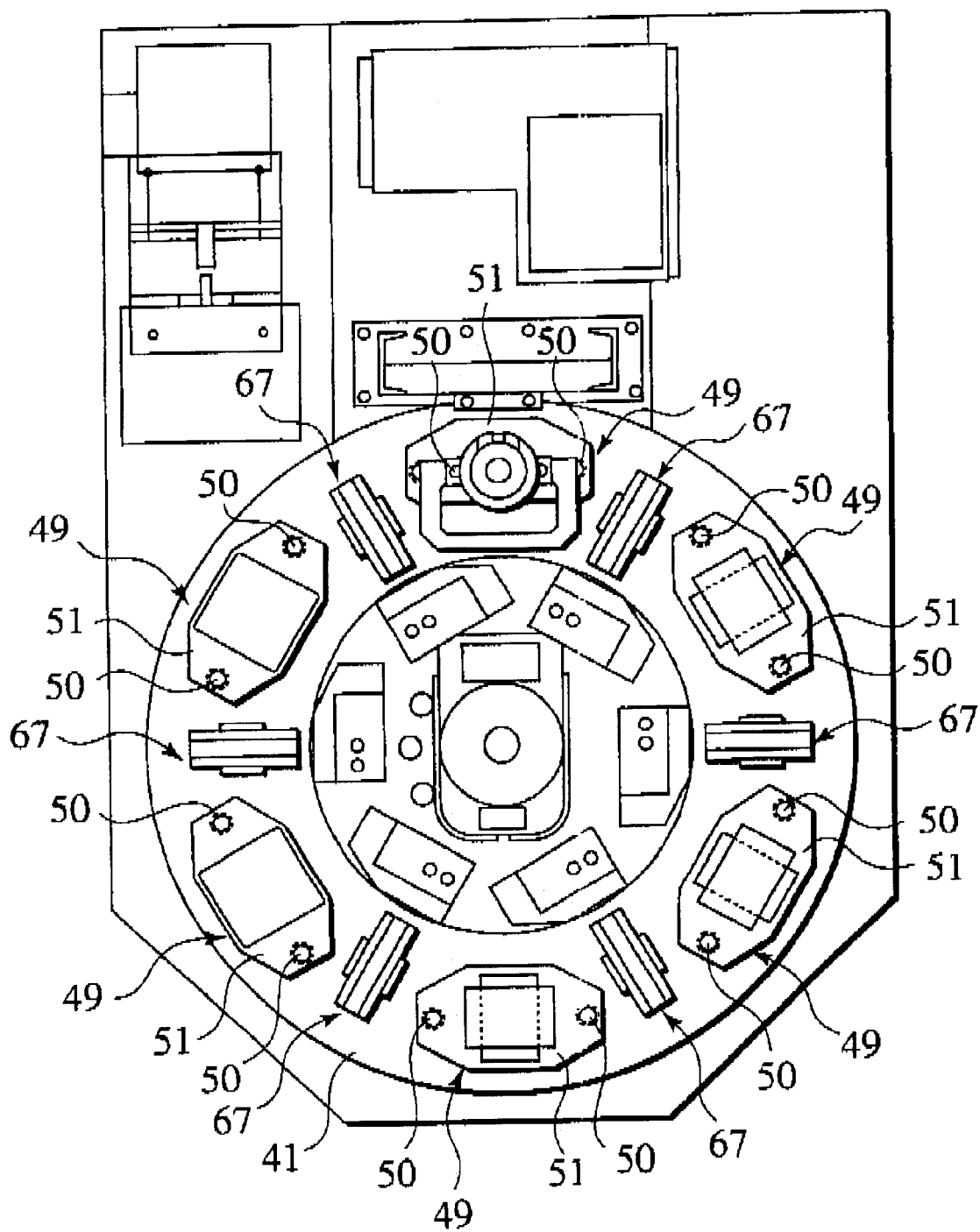
FIG. 10 is a plan view of the molding machine in accordance with the second embodiment of the present invention.

Channels for an air and a cooling water are respectively provided in an inner portion of the circular column core 58 so as to extend from a lower end of the core to a side surface in such a manner as to be separated into a forward route and a backward route, as shown in FIG. 9, and connection ports of the respective channels provided with annular grooves therewithin are provided in a rotary cylinder 60 in an outer periphery thereof. Further, the same number of relay blocks 67 as the number of the mold clamping apparatuses 49 provided with valve apparatuses (not shown) are placed on an upper surface of the turntable 41, as shown in FIG. 10, and air piping holes are opened together with electric power distributing holes in the turntable 41 close to the relay block 67.

The air channel and the water channel are connected to the respective pipe channels provided in the side of the pedestal 43 (which is not illustrated). Further, the air channels are again connected to respective air cylinder for clamping and opening and closing the mold disposed on the pedestal 43 from the piping holes via the relay block 67 from the connection port of the rotary cylinder. Further, the water channels are respectively connected to the lower portion 55 by the pipe channels.

As mentioned above, since the air channels and the water channels of the circular column core 58 are connected to the pipe channels in the side of the turntable 41 via the rotary cylinder 60 in the outer periphery rotating together with the turntable 41, it is possible to achieve a smooth communication with giving no problem to the rotation even in the case that the circular column core 58 is fixed.

In the drawing, reference numeral 70 denotes a frame stood on the pedestal 42. One end of a transverse frame 71 is fixed to an upper end of the frame 70. An upper side of an injection apparatus 80 is supported to the transverse frame 71. A middle portion of the injection apparatus 80 is supported to a transverse frame 73 supported to the frame 70. Further, a lower side of the injection apparatus 80 is supported to a placing plate 75, and the placing plate 75 is supported to a frame 72 fixed to the frame 70.

Figure 11:
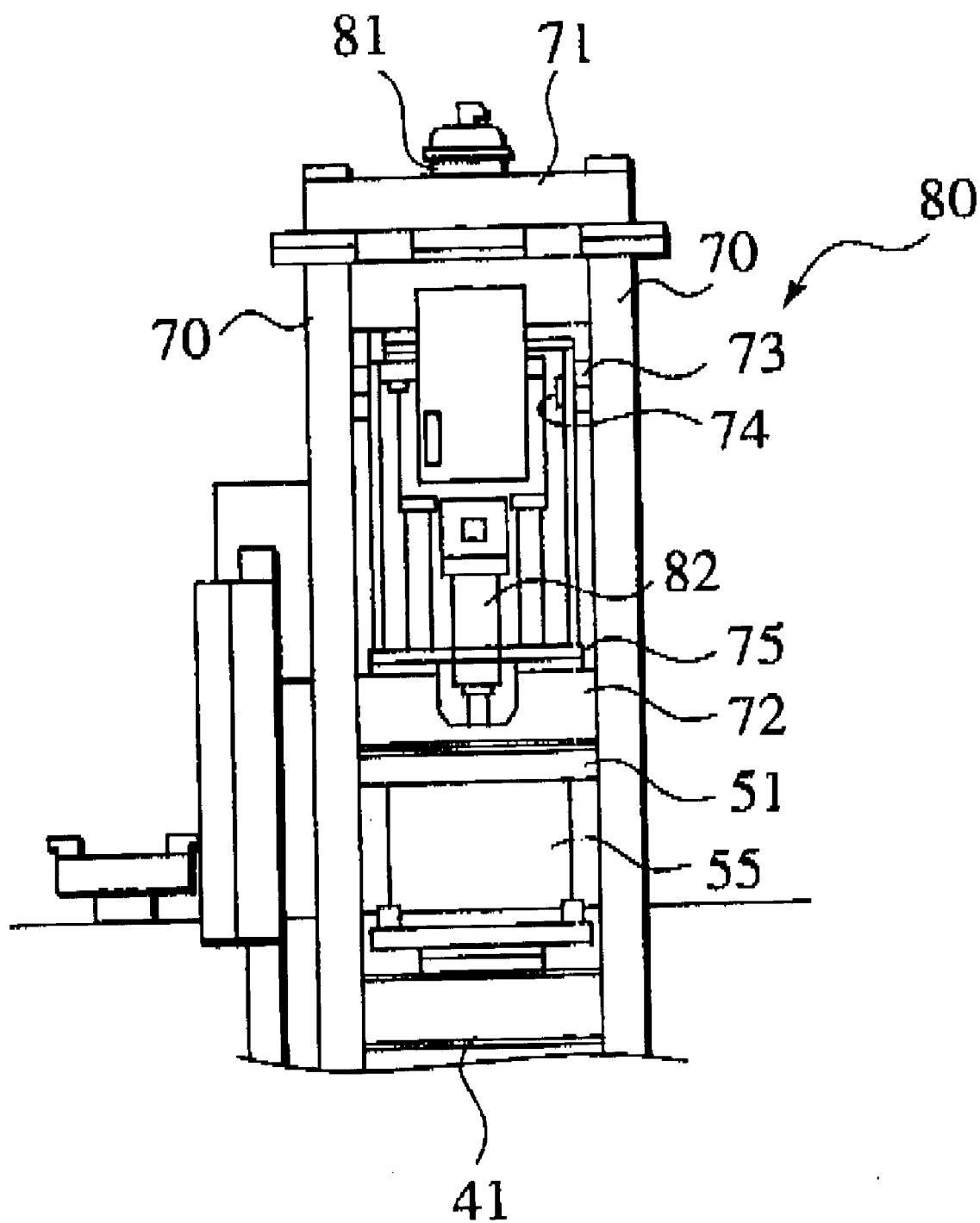
FIG. 11 is a front elevational view of an injection apparatus in accordance with the second embodiment of the present invention.

As shown in FIGS. 9 and 11, the injection apparatus 80 has a normal structure with setting a hydraulic pressure to an injection driving source, and is structured such that a nozzle at a front end of a heating cylinder 82 is downward placed on the placing plate 75. Further, the injection apparatus 80 is supported so as to freely rotate around a supporting shaft 74 of the frame 73, and is fixed by the placing plate 75. Further, the nozzle is structured such as to move so as to freely move in a vertical direction, and the nozzle is connected to the upper portion 55 from the hole portion of the upper movable plate 51 in the mold clamping apparatus 49 due to the downward movement.

In the molding machine having the structure mentioned above, the structure is made such that the mold clamping cylinder 53 constituted by the air cylinder is provided in each of the mold clamping apparatuses 49, and the upper movable plate 51 integrally connected to the lower movable plate 52 by the mold clamping rods 50 in both sides is vertically moved by the expansion and contraction of the piston rods in the mold clamping cylinder 53, whereby it is possible to open and close the upper and lower portions 55 and clamp the mold. Accordingly, the mold opening and closing apparatus and the molding clamping apparatus which are provided in the conventional rotary type molding machine are not required, and the structure of the apparatus becomes more simple.

After opening the mold 55 being in the clamped state, it is possible to take out the molded product by operating the ejector air cylinder 54, clamp the mold at that position and rotate the turntable 41 so as to immediately move to the injection position. Further, since the metal clamping cylinder 53 is in the mold clamping state even after the injection, it is not necessary to hold the molded product at the injection position even in the case of molding the molded product requiring a lot of time for cooling.

Further, in the hydraulic cylinder, it is necessary to receive the oil flowing out to the circuit together with opening and closing the mold in the accumulator, however, it is not necessary to received the air in the case of the air cylinder, and the structure of the mold clamping apparatus 49 becomes more simple. Since a response of air in the air cylinder is faster than that of the hydraulic pressure, it is advantageous in view of improving productivity.

Further, since the air corresponding to a drive source is lighter than the oil, and a weight of the air cylinder itself is lighter than the structure in the case of the hydraulic pressure, the load taken on the turntable 41 is reduced. Since it is sufficient by receiving a reaction force at a time when the nozzle of the injection apparatus 80 is connected to support the peripheral edge of the turntable 41, it is sufficient to protrude the plate body from a lower transverse frame 73 to an edge line lower side of the turntable 41 at the injection position so as to form a pressure receiving plate 90, whereby a sufficient space is secured in a lower side of the turntable 41, so that the mold clamping cylinder 53 is smoothly moved.

Further, since a steel frame is employed for placing the injection apparatus 80, the frame 71 is stood on the machine table 42, and the load of the injection apparatus 80 is reduced so as to support the injection apparatus 80 by the frame 71, the machine table 42 is made simple.

In accordance with the present embodiment, since it is possible to prevent the resin from being discharged until the molding resin is hardened by the back-flow preventing rod 35 if the mold having the same structure as that of the mold 17 constituted by the lower portion 18 and the upper portion 19 in accordance with the first embodiment mentioned above, it is possible to apply to the same molding procedure as that of the first embodiment mentioned above.

Next, a description will be given of a third embodiment in accordance with the present invention with reference to FIGS. 12 and 13.

A molding machine in accordance with the present embodiment is provided with a base table having a rotation driving portion, a turntable horizontally arranged above the base table and capable of rotating around a rotary shaft, and an injection portion 91 provided in a supporting column stood at a predetermined position around the turntable so as to freely move in a vertical direction. The turntable is provided with a plurality of molds 93 in a peripheral edge portion along a circumferential direction, and is structured such as to rotate so as to be arranged and fixed at every predetermined angle. Further, the injection portion 91 is provided with an injection nozzle 91A at a lower front end, and is vertically driven by a vertically driving portion (not shown) so as to inject a molding material, for example, a rubber or the like to the mold 93.

Figure 12:
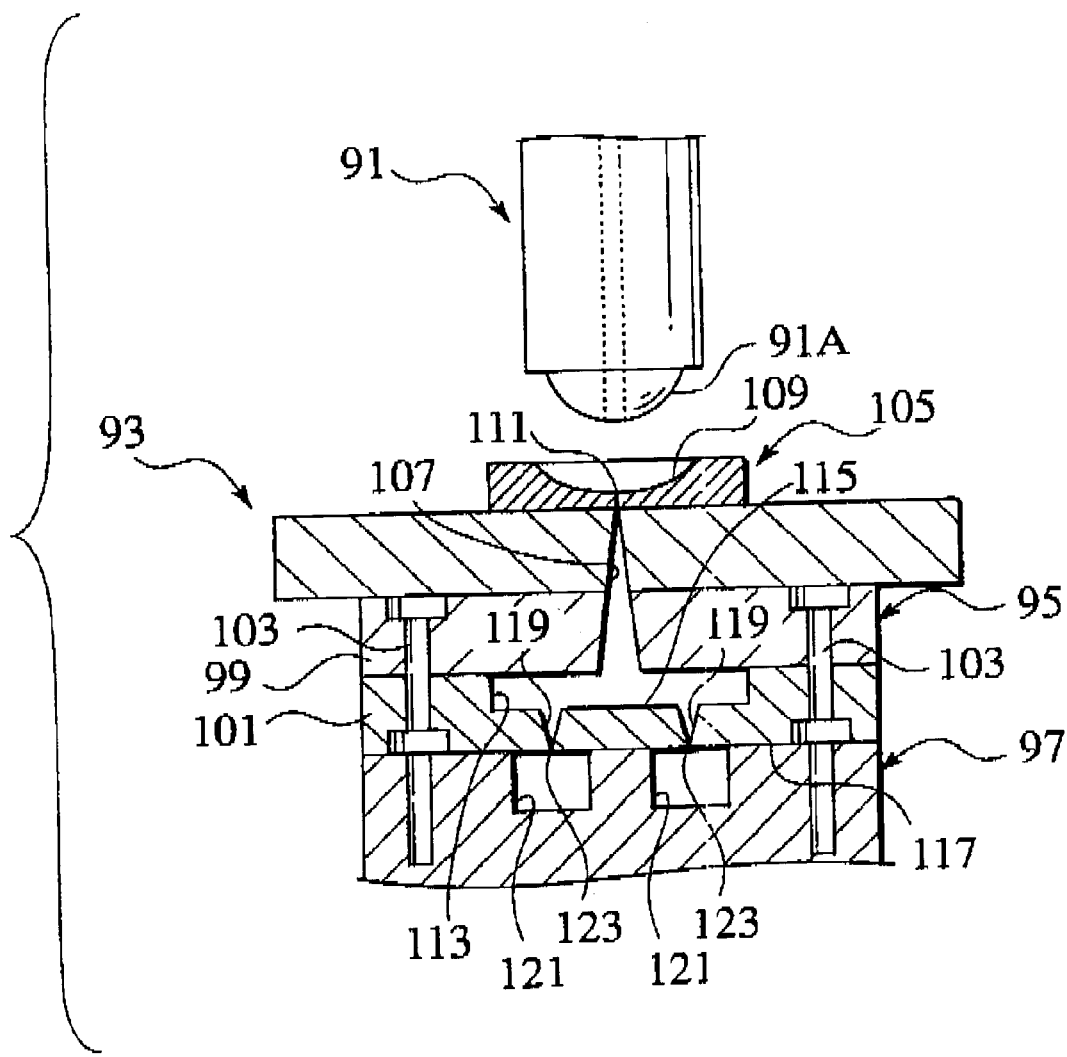
FIG. 12 is a cross sectional view showing a state of applying a secondary forming to a primary formed product by a mold of a molding machine in accordance with a third embodiment of the present invention.

As shown in FIG. 12, the mold 93 is constituted by a pair of upper portion 95 and lower portion 97. The upper portion 95 is always heated to a predetermined temperature by a heating apparatus (not shown), and is provided with an upper main body 99, a lower main body 101 and a cylinder 103 connecting between the both.

The upper main body 99 is provided with a nozzle contact portion 105 formed on an upper surface, and an upper material flow channel 107 vertically communicating the upper main body 99. The nozzle contact portion 105 is provided with a concave portion 109 protruding upward from the upper surface of the upper main body 99. This concave portion 109 is formed substantially in the same shape as that of the injection nozzle 91A of the injection portion 91, and the injection nozzle 91A is connected at a time of injecting the molding material within the mold 93 by the injection portion 91. Further, the concave portion 109 is provided with a material receiving port 111, and an upper material flow channel 107 is connected to the material receiving port 111.

The upper material flow channel 107 is constituted by a hole vertically communicating the upper main body 99, and a diameter thereof is gradually made smaller toward the upper side from the lower side, whereby the upper material flow channel 107 is connected to the material receiving port 111.

The lower main body 101 is provided with a lower material flow channel 113 connected to the material flow channel 107, on an upper surface thereof. The lower material flow channel 113 is formed in a recess shape toward the lower side from the upper surface of the lower main body 101. The lower material flow channel 113 has a diameter larger than a largest diameter of the upper material flow channel 107. Further, the lower material flow channel 113 is provided with a plurality of supply channels 119 communicated with the lower surface 117 of the lower main body 101 from a lower surface 115.

A plurality of supply channels 119 are constituted by holed respectively communicated with the lower main body 101 in a vertical direction, and a diameter thereof is gradually reduced toward the lower side from the upper side. These supply channels 119 respectively form material pouring ports 123 for injecting the molding material to a molding concave portion 121.

The cylinder 103 is connected to each of the upper main body 99 and the lower main body 101. When moving upward the cylinder 103, the upper main body 99 moves apart from the lower main body 101 together with the upward movement, and when moving downward it, the upper main body 99 also moves downward so as to be in close contact with the lower main body 101.

The lower portion 97 mentioned above is structured such as to be capable of being vertically moved by a lower portion vertically moving apparatus (not shown) provided below the turntable. Further, a molding concave portion 121 for receiving and arranging the primary formed product is formed on an upper surface of the lower portion 97, as shown in FIG. 12.

The primary formed product which is not completely injection molded is set within the mold 93 from which the secondary formed product completely injection molded has been already take out, on the turntable positioned at the set and detaching station. In particular, the primary formed product is arranged within the molding concave portion 121 of the lower portion 97 moved downward by the lower portion vertically moving apparatus, and the lower portion 97 is moved upward so as to bring the upper surface of the lower portion 97 into close contact with the lower surface of the upper portion 95.

Next, the turntable is rotated at a predetermined angle by the rotation driving portion, whereby the mold 93 to which the primary formed product is set in the set and detaching station moves to the injection station below the injection nozzle 91A of the injection portion 91.

Subsequently, after the mold 93 moves to and stops at the injection station, the injection portion 91 moves downward by a vertically movement driving apparatus, and injects the liquid-phase molding material from the injection nozzle 91A.

When the molding material is injected from the injection nozzle 91A, the molding material passes within the material flow channel 107 so as to be injected within the molding concave portion 121 through the supply channel 119 from the material pouring port 123, thereby applying a secondary forming to the primary formed product within the molding concave portion 121. Thereafter, when the molding material is injected within a whole of the material flow channel 107, the injection of the molding material to the mold 93 by the injection portion 91 is finished.

At this time, since the upper portion 95 is always heated, the molding material within the material flow channel 107 is heated and cured. Accordingly, the mold 93 is in a state that the material receiving port 111 is closed by the molding material cured within the material flow channel 107, whereby it is possible to prevent the molding material within the mold 93 from backward flowing.

The mold 93 to which the molding material is injected moves to the vulcanization station step by step. At a time of moving, the mold 93 is heated, the molding material injected within the molding concave portion 121 is vulcanized and the secondary formed product is formed. Then, the mold 93 is moved to the set and detaching station and the secondary formed product is taken out.

Figure 13:
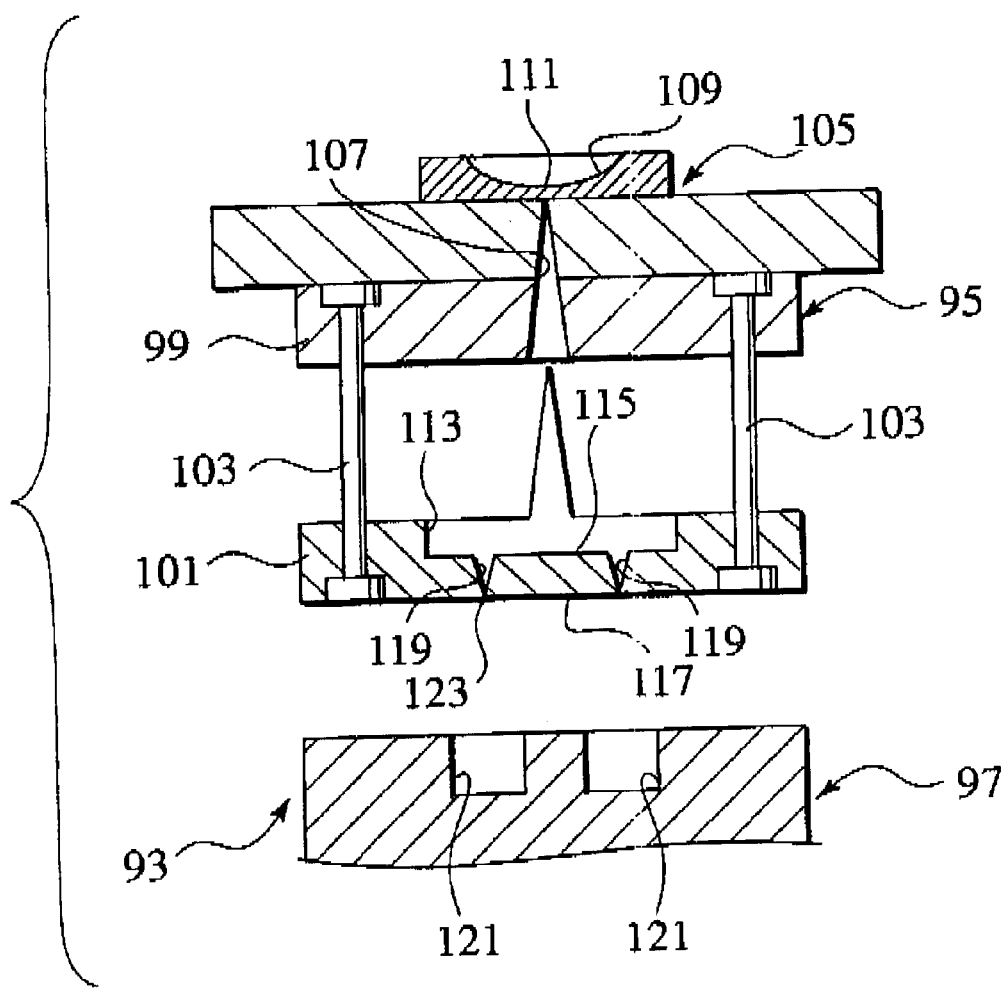
FIG. 13 is a cross sectional view showing a motion after applying the secondary forming to the primary formed product by the mold shown in FIG. 12.

At a time of taking out the secondary formed product from the mold 93, as shown in FIG. 13, at first, the lower portion 97 is moved downward, and the cylinder 103 is moved upward so as to move the upper main body 99 of the upper portion 95 apart from the lower main body 101. At this time, the cylinder 103 moves upward the upper main body 99 until the upper side of the molding material cured within the material flow channel 107 is exposed from the upper main body 99.

Next, the cured molding material is removed from the above 95, and the secondary formed product injection molded is taken out from the lower portion 97. Then, the ascending force of the cylinder 103 is removed so as to generate a state that the lower surface of the upper main body 99 and the upper surface of the lower main body 101 are closely in contact with each other. Thereafter, the primary formed product is set to the mold 93.

As mentioned above, in the mold 93 in accordance with the present embodiment, since the molding material within the material flow channel 107 is cured in a state that the injection of the molding material into the mold 93 is finished, so as to close the material receiving port 111, it is possible to prevent the molding material from backward flowing from the mold 93 only by injecting the molding material within the mold 93 without a complex operation for closing.

Further, the time for which the mold 93 stays in the injection station is sufficiently achieved by the time required for the injection operation without relation to the time for which the molding material is cured. Accordingly, it is possible to proceed the procedure step by step, and it is possible to realize a high productivity.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A molding machine comprising:
   an injection portion comprising an injection nozzle which injects a molding material;
   a turntable comprising a rotation driving apparatus;
   a plurality of molds placed along a peripheral edge of the turntable comprising:
     a material receiving port through which the molding material is pouring from the injection nozzle and;
     a mechanism for closing the material receiving port so as to prevent the molding material from flowing backward through the material receiving port;
   an attaching and detaching station whose primary formed products are attached to the molds and secondary formed products are detached from the molds;
   an injection station where an injection molding is achieved with the primary formed products which are attached to the molds at the attaching and detaching station to be the secondary formed products and;
   a plurality of curing stations placed between the attaching and detaching station and the injection station where the injected molding material is cured;
   wherein the molds are transferred by rotation of the turntable to each station one by one and the material receiving port communicates with the injection nozzle when the mold is positioned at the injection station.

2. A molding machine according to claim 1, wherein:
   each mold comprises an upper portion and an lower portion;
   the upper portion comprises a material flow channel formed in a vertical direction which communicates with the material receiving port and a back-flow preventing rod added a power directed upward which is fitted into the material flow channel and allowed to be movable in a vertical direction;
   the material receiving port is closed by the back-flow preventing rod when the top end of the back-flow preventing rod is extruded from the material receiving port and;
   the material receiving port is opened so that the molding material can be poured through the material flow channel when the injection nozzle pushes the top end of the back-flow preventing rod downward.

3. A molding machine according to claim 2, wherein each mold further comprises a forming cavity between the upper portion and the lower portion of the mold where the primary formed products are attached and an injection molding is achieved.

4. A molding machine according to claim 2, wherein each of the upper portions of the molds further comprises;
   a material intake channel which communicates with the material flow channel;
   a material pouring port through which the molding material is pouring into the forming cavity and;
   a piston mechanism which opens and closes the material pouring port.

5. A molding machine according to claim 1, further comprising one or more heaters which heat the molds wherein the molding material is thermosetting resin and cured by the heater.

6. A molding machine according to claim 2, wherein;
   the injection portion further comprises a injection mechanism which is driven by oil-hydraulic circuit and;
   the turntable further comprises mold clamping mechanisms which are driven by pneumatic circuit wherein the mold clamping mechanisms keep the upper portions and the lower portions of the molds clamped for a fixed time.

7. A molding machine according to claim 1, wherein;
   each mold comprises an upper portion and an lower portion;
   the upper portion comprises a material flow channel formed in a vertical direction which communicates with the material receiving port and a heater which heats the material flow channel and;
   the molding material is thermosetting resin and cured by the heater so that the resin cured in the material flow channel closes the material receiving port.

* * * * *

UNITED STATES PATENT AND TRADEMARK OFFICE
CERTIFICATE OF CORRECTION

PATENT NO. : 6,638,047 B2
DATED : October 28, 2003
INVENTOR(S) : Fumio Asai et al.

It is certified that error appears in the above-identified patent and that said Letters Patent is hereby corrected as shown below:

<u>Title page,</u>
Item [57], ABSTRACT,
Line 9, "a mechanism which close" should read -- a mechanism which closes --.
Line 16, "took out" should read -- taken out --.

<u>Column 14,</u>
Lines 2-3, "an lower portion;" should read -- a lower portion --.
Lines 37-38, "a injection mechanism" should read -- an injection mechanism --.
Lines 45-46, "an lower portion;" should read -- a lower portion; --.

Signed and Sealed this

Thirteenth Day of January, 2004

JON W. DUDAS
*Acting Director of the United States Patent and Trademark Office*